US012692158B2

(12) United States Patent
Nickel et al.

(10) Patent No.: US 12,692,158 B2
(45) Date of Patent: Jul. 28, 2026

(54) SULFIDIC SOLID ELECTROYLYTE AND ITS PRECURSOR II

(71) Applicant: AMG Lithium GmbH, Frankfurt am Main (DE)

(72) Inventors: Vera Nickel, Haiger (DE); Hannes Vitze, Idstein (DE); Christine Gabbey, Marburg (DE); Stefanie Riehl, Rödermark (DE); Stefan Scherer, Griesheim (DE); Martin Janssen, Nauheim (DE)

(73) Assignee: AMG LITHIUM GMBH, Frankfurt am Main (DE)

( * ) Notice: Subject to any disclaimer, the term of this patent is extended or adjusted under 35 U.S.C. 154(b) by 718 days.

(21) Appl. No.: 17/763,979

(22) PCT Filed: Sep. 24, 2020

(86) PCT No.: PCT/EP2020/076659
§ 371 (c)(1),
(2) Date: Mar. 25, 2022

(87) PCT Pub. No.: WO2021/058621
PCT Pub. Date: Apr. 1, 2021

(65) Prior Publication Data
US 2022/0340425 A1     Oct. 27, 2022

(30) Foreign Application Priority Data

Sep. 27, 2019    (EP) ..................................... 19200243

(51) Int. Cl.
*C01B 25/14*        (2006.01)
*C01B 17/22*        (2006.01)
(Continued)

(52) U.S. Cl.
CPC .............. *C01B 25/14* (2013.01); *C01B 17/22* (2013.01); *H01M 8/124* (2013.01);
(Continued)

(58) Field of Classification Search
CPC ............ H01M 8/124; H01M 10/0562; H01M 10/052; H01M 10/0525; H01M 2008/128;
(Continued)

(56) References Cited

U.S. PATENT DOCUMENTS

2014/0227606 A1* 8/2014 Suzuki .................. H01M 4/131
                                                          429/304
2016/0172706 A1* 6/2016 Xiao ................... H01M 10/052
                                                          429/189
(Continued)

FOREIGN PATENT DOCUMENTS

EP          3502051 A1    6/2019
JP      2017103146 A  *  6/2017
(Continued)

OTHER PUBLICATIONS

Rosero-Navarro Nataly Carolina, et al., "Preparation of lithium ion conductive Li6PS5Cl solid electrolyte from solution for the fabrication of composite cathode of all-solid-state lithium battery", Journal of Sol-Gel Science and Technology, vol. 89, No. 1, Aug. 16, 2018 (Aug. 16, 2018), pp. 303-309.
(Continued)

*Primary Examiner* — Adam J Francis
(74) *Attorney, Agent, or Firm* — Rothwell, Figg, Ernst & Manbeck, P.C.

(57)        ABSTRACT

The present invention relates to a solid electrolyte, its precursor, methods for producing the same as well as its use, e.g. in electrochemical cells and capacitors, fuel cells, batteries and sensors.

17 Claims, 1 Drawing Sheet

(51) Int. Cl.
_H01M 8/12_ (2016.01)
_H01M 8/124_ (2016.01)
_H01M 10/0562_ (2010.01)

(52) U.S. Cl.
CPC ..... _H01M 10/0562_ (2013.01); _C01P 2002/54_ (2013.01); _C01P 2002/72_ (2013.01); _C01P 2006/40_ (2013.01); _H01M 2008/128_ (2013.01); _H01M 2300/008_ (2013.01)

(58) Field of Classification Search
CPC .... H01M 2300/008; H01M 2300/0068; C01B 25/14; C01B 17/22; C01P 2002/54; C01P 2002/72; C01P 2006/40; Y02P 70/50
See application file for complete search history.

(56) References Cited

U.S. PATENT DOCUMENTS

| | | | |
|---|---|---|---|
| 2017/0179521 A1* | 6/2017 | Sakamoto | H01M 4/0471 |
| 2018/0316056 A1* | 11/2018 | Katoh | H01M 10/054 |
| 2018/0358653 A1 | 12/2018 | Maruyama et al. | |
| 2019/0190007 A1* | 6/2019 | Seong | H01M 10/052 |
| 2019/0273283 A1* | 9/2019 | Kim | H01M 10/0562 |
| 2021/0020982 A1* | 1/2021 | Hayashi | H01M 10/0585 |
| 2021/0257657 A1* | 8/2021 | Liang | H01M 10/0585 |

FOREIGN PATENT DOCUMENTS

| | | |
|---|---|---|
| WO | 2018/054709 A1 | 3/2018 |
| WO | 2009/047254 A1 | 4/2019 |

OTHER PUBLICATIONS

Extended Search Report issued in European Application No. 19200243.4, 9 pgs., Dec. 2, 2019.
International Search Report and Written Opinion issued in PCT/EP2020/076659, dated Jan. 14, 2021, 15 pgs.
Extended European Search Report for EP19200243.4 dated Dec. 2, 2019, 8 pages.
Rosero-Navarro et al., "Preparation of lithium ion conductive Li6PS5Cl solid electrolyte from solution for the fabrication of composite cathode of all-solid-state lithium battery"; Journal of Sol-Gel science and Technology(2019), 89:303-309.

* cited by examiner

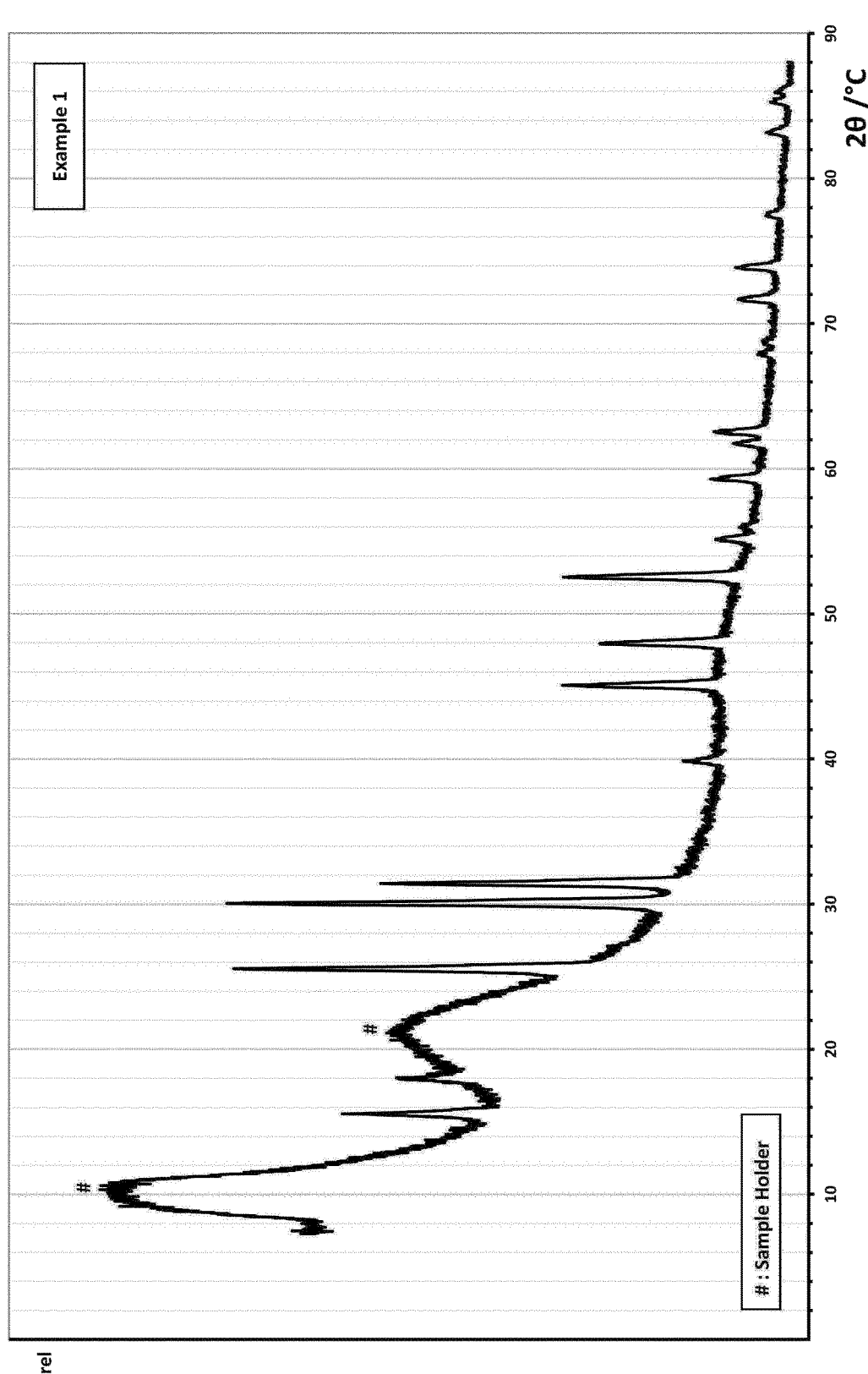

SULFIDIC SOLID ELECTROYLYTE AND ITS PRECURSOR II

CROSS REFERENCE TO RELATED APPLICATION

This application is a 35 U.S.C. 371 National Phase Entry Application from PCT/EP2020/076659, filed Sep. 24, 2020, which claims the benefit of European Patent application Ser. No. 19/200,243.4 filed on Sep. 27, 2019, the disclosures of which are incorporated herein in their entirety by reference.

The present invention relates to a solid electrolyte, its precursor, methods for producing the same as well as its use, e.g. in electrochemical cells and capacitors, fuel cells, batteries and sensors.

Solid electrolytes provide highly mobile ions in an otherwise rigid crystal structure. They are particularly suitable for applications in batteries, fuel cells and sensors as their specific structure supersedes an additional liquid or membrane usually separating the electrodes. By this means, health and safety risks related to harmful or flammable organic liquid electrolytes are avoided. Moreover, it has been shown that solid electrolytes have excellent electronic properties such as high ionic conductivity and electrochemical stability.

A particularly relevant group of solid electrolytes for electrochemical storage devices are cationic solid electrolytes providing mobile lithium ions, such as lithium argyrodite type solid electrolytes, and particularly sulfidic lithium argyrodite type solid electrolytes having the general formula $Li_{12-m-x}^+M^{m+}S_{6-x}^{2-}X_x^-$ with $M^{m+}=Si^{4+}$, $Ge^{4+}$, $Sn^{4+}$, $P^{5+}$, $As^{5+}$; $X^-=Cl^-$, $Br^-$, $I^-$; $0 \le x \le 2$.

WO 2009/047254 A1 describes a method for producing a sulfidic lithium argyrodite having the formula $Li_6PS_5Z$ with Z being selected from Cl, Br and I, comprising the steps of mixing the solid reactants comprising $Li_2S$, $P_2S_5$ and a halogen source in an inert gas atmosphere, pressurizing the mixture and subsequent heating the compact obtained.

US 2018/0358653 A1 discloses a method for producing a solid electrolyte having an argyrodite type crystal structure, comprising milling a raw material comprising lithium, sulfur, phosphorus and halogen as constituent elements, and subsequent heat-treating.

A drawback of the above described solid phase syntheses is that the milling or mixing step does not ensure a homogeneous distribution of the reactants over the raw material to be heated. Thus, the resulting solid electrolyte contains impurities of accumulated, unreacted starting material and/or has an inhomogeneous structure due to the formation of secondary phases of differing composition, impairing the electronic properties of the electrolyte.

WO 2018/054709 A1 discloses a process for preparing a solid electrolyte based on lithium, phosphorus and sulfur, such as $Li_4PS_4I$, in an organic solvent by mixing and heating the reactants in an inert gas atmosphere.

Though providing a more homogeneous distribution of the reactants than solid phase based methods, solvent based methods require costly and time consuming separation, drying and washing steps to remove the organic solvent from the reaction product. Moreover, remaining solvent molecules might interfere with the electronic properties of the solid electrolyte, e.g. reducing its ionic conductivity.

Considering the above, there is an urgent need of new methods for producing a solid electrolyte which overcome the drawbacks of the known processes and allow for the provision of improved solid electrolyte materials.

Thus, the object of the present invention is the provision of a fast, easy and cost-effective method for producing homogeneous solid electrolytes with excellent electric properties such as high ionic conductivity and electrochemical stability.

It was surprisingly found that a solid state reaction comprising reacting a solid electrolyte precursor having the formula $$Li_{(2a-n)}Y^{n+}+S_a \qquad (I)$$

wherein Y is independently selected from P, As, Ge, Sn, B, Si, Al, Ga and Sb,
$3 \le n \le 5$, preferably $4 \le n \le 5$, and
$3 \le a \le 6$, preferably $4 \le a \le 6$
with X-containing Lithium salt allows for the provision of an improved solid electrolyte having high impurity and homogeneity represented by the formula $$Li_{(2b+c-m)}Y^{m+}S_bX_c \qquad (II)$$

wherein X is independently selected from group 17 elements such as Cl, Br, I, Y is independently selected from P, As, Ge, Sn, B, Si, Al, Ga and Sb,
$3 \le m \le 5$, preferably $4 \le m \le 5$,
$3 \le b \le 6$, more preferably $4 \le b \le 6$, and
$0 \le c \le 2$,
or $$Li_{(8-q^*(1-t)-r^*(t))}Y'^{q+}_{1-t}Y''^{r+}_tS_4 \qquad (III)$$

wherein Y" is independently selected from Si, and Ge, Y" is independently selected from P, Al, Sn, Ga, and Sb,
$3 \le q \le 5$
$2 \le r \le 6$
$0 \le t \le 1$.

In the solid electrolyte precursor of formula (I), Y is preferably independently selected from one or more of P, As, Ge, Sn, B, Si, Al, Ga and Sb in their respective oxidation states such as $P^{5+}$, $As^{5+}$, $Ge^{4+}$, $Sn^{4+}$, $B^{3+}$, $Si^{4+}$, $Al^{3+}$, $Ga^{3+}$ and $Sb^{5+}$. In a preferred embodiment Y is $P^{5+}$, $As^{5+}$, and/or $Ge^{4+}$.

The stoichiometry of S may be $4.8 \le a \le 5.2$. In a more preferred embodiment a is 4 or 5.

n is in the range of $3 \le n \le 5$, preferably $4 \le n \le 5$. Particularly, n is 5.

The precursor according to the invention is preferably selected from $Li_5PS_5$, $Li_5AsS_5$, $Li_4GeS_4$, $Li_4SiS_4$, $Li_3BS_3$, $Li_4SnS_4$, $Li_3GaS_3$, $Li_3AlS_3$, $Li_5SbS_5$, more preferably $Li_5PS_5$, $Li_5AsS_5$, $Li_4GeS_4$, $Li_4SiS_4$, $Li_4SnS_4$, $Li_5SbS_5$, or mixtures thereof, such as physical mixtures, mixed crystals and/or solid solutions.

The solid electrolyte precursor has at least partially ordered atomic arrangement and is preferably in a partially crystalline or crystalline state, in particular a crystalline state, and the atomic arrangement of the precursor may be determined by conventional means known in the art such as a X-ray diffraction (XRD).

In a preferred embodiment, the solid electrolyte precursor is in the form of a pure phase. The presence of a pure phase can be detected by X-ray diffraction (XRD) as known by the skilled person and in the art.

Particularly, the solid electrolyte precursor according to the invention is substantially free from reflections in a X-ray powder diffractogram using $CuK_\alpha$ radiation at a $2\theta$ angle [°]: 15.0, 17.5, 18.1, 18.8, 23.7, 24.9, 25.2, 27.9, 28.2, 29.2, 29.6, 29.7, 29.8, 30.0, 31.0, 31.6, 32.1, 32.3, 44.8, 52.1, 53.1, 53.9 corresponding to reflections of undesired impurities.

The term "substantially free from reflections" in the sense of the present invention means that reflections at the respective $2\theta$ angles have an intensity of at most 5%, preferably at most 2%, more preferably at most 1% of the most intense product reflection recorded for the respective compound. "Characteristic reflections" in the sense of the present invention are reflections having an intensity of at least 40%, preferably at least 50%, more preferably at least 60% of the most intense reflection recorded for the respective compound.

The solid electrolyte precursor according to the invention has an improved product homogeneity and purity, e.g. lacking unreacted starting material and secondary phases of differing composition.

The precursor may further comprise at least one dopant. A dopant in the sense of the present invention is a supplementary element that is introduced into the solid electrolyte precursor (crystal) structure e.g. to alter its electrical properties, and is preferably present in an amount of less than 10 wt. %, more preferably 0.01-9.0 wt. %, even more preferably 0.10-5.0 wt. %, with reference to the total weight of the precursor. The type of dopant as well as its concentration significantly influences the resulting material properties. Suitable dopants are e.g. Mn, Ge, Sn, V, Ni, Cr, Si, Al, As, O, Se, Te, Mg, Na, Ca, Sb, B, Ga or a mixture thereof, in their respective oxidation state. Dopants selected from B, As, Se and Ni, in their respective oxidation state, more preferably $B^{3+}As^{5+}$, $Se^{2-}$ and $Ni^{2+}$ are particularly beneficial for increasing the ionic conductivity or enabling mixed electronic and ionic conduction.

In a further aspect, the present invention refers to a method for producing a solid electrolyte precursor according to the invention comprising the steps of (i) providing a lithium salt in a reaction vessel, (ii) contacting at least one sulfur-containing reaction gas with the lithium salt of step (i) at elevated temperatures, (iii) contacting at least one Y-containing component with the product obtained in step (ii) at elevated temperatures, and (iv) optionally discharging the product obtained in step (iii), wherein the Y-containing component is at least partially present in a gaseous phase in step (iii).

In step (i) a lithium salt, preferably LiOH, $Li_2CO_3$, $Li_2SO_4$, $Li_2O$, $Li_2O_2$ or a mixture thereof, more preferably LiOH, is provided. The lithium salt may further contain crystal water and/or water not being incorporated in its crystal structure, preferably $Li_2SO_4 \cdot H_2O$ or $LiOH \cdot H_2O$. The overall water content of the lithium salt provided in step (i) may be 0-50 wt. %, such as 10-45 wt. %. In a preferred embodiment, the lithium salt is substantially free from water, e.g. having a water content of less than 5 wt. %, preferably less than 0.01-1 wt. %, more preferably less than 0.1 wt. %.

Optionally, step (i) is preceded by a step of pre-drying the lithium salt at an elevated temperature, such as at least 80° C., preferably 90-250° C., optionally at reduced pressure, i.e. below atmospheric pressure (<1013 mbar), such as below 500 mbar, e.g. 0.001-100 mbar. Such pre-dried lithium salt may be substantially free from water, e.g. having a water content of less than 5 wt. %, preferably less than 0.01-1 wt. %, more preferably less than 0.1 wt. %.

Step (i) and optionally the step of pre-drying may be carried out in dry air or an inert gas atmosphere, such as $N_2$, He or Ar atmosphere. Preferably, the inert gas or dry air is substantially free from water, i.e. having a relative humidity (RH) of less than 10%, preferably less than 5 vol. %, more preferably 0.01-2%.

In step (ii) the lithium salt of step (i) is contacted with at least one sulfur-containing reaction gas at elevated temperatures, such as above 80° C., preferably at 90-250° C.

Step (ii) may be carried out in dry air or in gas atmosphere such as in $N_2$, He or Ar atmosphere, wherein the inert gas or dry air is preferably substantially free from water, i.e. having a RH of less than 10%, preferably less than 5%, more preferably 2%. In case both, step (i) and step (ii) are carried out in an inert gas or dried air atmosphere said gases may be (essentially) the same.

The sulfur-containing reaction gas is preferably selected from $H_2S$, $S_8$, $CS_2$, mercaptanes or a mixture thereof, and is preferably $H_2S$.

In a preferred embodiment, the sulfur-containing reaction gas is substantially free from water, i.e. has a RH of less than 10%, preferably less than 5%, more preferably 0.01-2%. The sulfur-containing reaction gas may further comprise a carrier gas. A suitable carrier gas is inert and may be selected from dry air and inert gases known in the art such as $N_2$, He or Ar preferably from dry air or $N_2$ and is particularly substantially free from water, i.e. having a RH of less than 10 vol. %, preferably less than 5 vol. %, more preferably 0.01-2 vol. %. Preferably, the carrier gas corresponds to the gas applied in step (i).

The molar ratio in step (ii) of S in sulfur-containing reaction gas, preferably $H_2S$, to Li in lithium salt provided in step (i) is preferably 1:1-1:10, more preferably 1:1-1:5, even more preferably 1:2.

The product obtained in step (ii) is contacted with a Y-containing component at elevated temperatures. The Y-containing component is preferably a sulfide of Y, more preferably $P_2S_5$, $As_2S_5$, $GeS_2$, $SnS_2$, $B_2S_3$, $SiS_2$, $Al_2S_3$ $Ga_2S_3$, $Sb_2S_5$ or a mixture thereof.

The Y-containing component is preferably substantially free from water, i.e. has a RH of less than 10 vol. %, preferably less than 5 vol. %, more preferably 0.01-2 vol. %.

In a preferred embodiment step (ii) may be performed at a total gas flow of 0.1-1000 $m^3/h$, preferably 5-500 $m^3/h$, more preferably 15-50 $m^3/h$, wherein the total gas flowing includes the at least one sulfur-containing reaction gas and the carrier gases, if applicable. The total gas flow may inter alia depend on the amount of lithium salt provided in step (i), the type of precursor to be obtained and the reaction temperature. Moreover, the total gas flow may also be depended on the amount of water formed as a bi-product in step (ii), as the removal of said water, i.e. by the gas flow passing the reaction vessel is essential for the full conversion of the lithium salt in step (ii).

According to the invention the Y-containing component is at least partially present in a gaseous state. Step (iii) is preferably performed at temperatures above 285° C., preferably at 288-1200° C., more preferably at 288-900° C. The Y-containing component may further comprise a carrier gas. A suitable carrier gas is inert and may be selected from dry air and inert gases known in the art such $N_2$, He or Ar, preferably from dry air or $N_2$, and is particularly substantially free from water, i.e. having a RH of less than 10 vol. %, preferably less than 5 vol. %, more preferably 0.01-2 vol. %. Preferably, the carrier gas corresponds to the carrier gas applied in step (i) and/or step (ii), if applicable.

In a preferred embodiment, the molar ratio of Y in Y-containing component, such as $P_2S_5$, to lithium in lithium salt provided in step (i) is 1:1-1:10, preferably 1:3-1:6, more preferably about 1:5.

In a preferred embodiment step (iii) is contacted at a total gas flow of 0.1-1000 $m^3/h$, preferably 5-500 $m^3/h$, more preferably 15-50 $m^3/h$, wherein the total gas flow includes the at least one Y-containing component if present in a gaseous state and the carrier gases, if applicable. The total gas flow may inter alia depend on the amount of lithium salt provided in step (i), the precursor to be obtained and the reaction temperature. Moreover, the total gas flow may also be dependent on the amount of water formed as a by-product in step (ii) as the removal of said water, e.g. by the gas flow passing the reaction vessel is essential for full conversion of the lithium salt in step (ii).

Furthermore, the amount of water by-product may serve as a reaction control to determine the time point of (essentially) full conversion of the lithium salt in step (ii). By this means, the duration of step (ii) may be individually adapted to the reaction conditions. Preferably, the duration of step (ii) is up to 24 h, such as 15 min-15 h, dependent on the individual reaction conditions.

The method according to the invention may further comprise a step (ii.1) prior to step (iii) in which at least one doping agent is added to the product in step (ii). The doping agent may be an anionic or cationic doping agent. Cationic doping agents may comprise Mn, Ge, Sn, V, Ni, Cr, Si, Al, As, O, Se, Te, Mg, Na, Ca, Sb, B and Ga in their respective oxidation states. Anionic doping agents may comprise $O^{2-}$, $Se^{2-}$ or $Te^{2-}$. The doping agent may be present in liquid, solid or gaseous form. Preferably, the doping agent is present in solid form such as in the form of a salt. Suitable cationic doping agents are e.g. hydroxide, carbonate or sulfide salts, such as $As_2S_5$, $Ni(OH)_2$ or $Mg(CO_3)$ or a mixture thereof. Suitable anionic doping agents are e.g. lithium salts, such as $Li_2O$, $Li_2Se$ or $Li_2Te$ or a mixture thereof. Step (ii.1) may additionally comprise mixing the product obtained in step (ii) and the at least one doping agent by means of grinding, e.g. by a ball mill, or stirring known in the art.

Optionally, the product obtained after such doping step is discharged from the reaction vessel. In another embodiment, the product obtained in step (ii) or the product obtained after a doping step is left in the reaction vessel and further reacted to yield a solid electrolyte as described herein.

The method of the invention may further comprise a step (iii.1) wherein at least one doping agent is added to the product obtained in step (iii). The doping agent is preferably an anionic or cationic doping agent. Preferred cationic doping agents comprise Mn, Ge, Sn, V, Ni, Cr, Si, Al, As, O, Se, Te, Mg, Na, Ca, Sb, B and Ga in their respective oxidation states. Anionic doping agents may comprise $O^{2-}$, $Se^{2-}$ or $Te^{2-}$ The doping agent may be present in liquid, solid or gaseous form. Preferably the doping agent is present in solid form such as in the form of a salt. Suitable cationic doping agents are e.g. hydroxide, carbonate or sulfide salts, such as $As_2S_5$, $Ni(OH)_2$ or $Mg(CO_3)$ or a mixture thereof. Suitable anionic doping agents are e.g. lithium salts, such as $Li_2O$, $Li_2Se$ or $Li_2Te$ or a mixture thereof. Step (iii.1) may additionally comprise mixing the product obtained in step (iii) and at least one doping agent by means of grinding, e.g. by a ball mill or stirring known in the art.

The amount of doping agent added to the product obtained in step (ii.1) or (iii.1) is e.g. dependent on the type of doping agent and the amount of product obtained in step (ii) or (iii) and particularly results in an amount of dopant in the solid electrolyte being less than 10 wt. %, preferably 0.01-9.0 wt. %, more preferably 0.10-5.0 wt. %, with reference to the total weight of the solid electrolyte precursor.

Optionally, the product obtained after such doping step is discharged from the reaction vessel. In another embodiment, the product obtained in step (iii) or the product obtained after a doping step is left in the reaction vessel and further reacted to yield a solid electrolyte as described herein.

In order to provide a proper reaction atmosphere such as an inert gas or dry air atmosphere during step (i) and/or step (ii), and/or step (iii) the reaction vessel may be sealed, thus being isolated from the surrounding, while at least one gas inlet and at least one gas outlet allow for the controlled introduction and removal of gas such as dry air, inert gas, reaction gas, carrier gas and/or water vapor into and from the vessel, respectively. A suitable reaction vessel is e.g. a heatable fluidized bed reactor known in the art.

The solid electrolyte precursor according to the invention may be used for preparing a solid electrolyte, in particular a sulfidic solid electrolyte.

In particular, the solid electrolyte is represented by formula (II):

$$Li_{(2b+c-m)}Y^{m+}S_bX_c \qquad \text{(II)}$$

wherein X is independently selected from group 17 elements, such as Cl, Br and I, Y is independently selected from P, As, Ge, Sn, B, Si, Al, Ga, and Sb, $3 \leq m \leq 5$, preferably $4 \leq m \leq 5$, $3 \leq b \leq 6$, preferably $4 \leq b \leq 6$, and $0 \leq c \leq 2$, or is represented by formula (III):

$$Li_{(8-q*(1-t)-r*t)}Y'^{q+}_{1-t}Y''^{r+}_tS_4 \qquad \text{(III)}$$

wherein Y' is independently selected from Si, and Ge,

Y" is independently selected from P, Al, Sn, Ga, and Sb, $3 \leq q \leq 5$ $2 \leq r \leq 6$ $0 \leq t \leq 1$.

Preferably, the solid electrolyte is represented by formula (II).

X is independently selected from group 17 elements (i.e. halogens), preferably from F, Cl, Br and I, more preferably from Cl, Br and I. In one embodiment X is F or Cl or Br or I, preferably Cl or Br or I. In another embodiment X is a mixture of at least two group 17 elements such as a mixture of Cl and Br, Cl and I or Br and I with a ratio of element X1 to element X2 of 0.01:0.99-0.99:0.01, preferably 0.1:0.9-0.1, more preferably 0.3:0.7-0.7:0.3, such as $X=(Cl_{0.5}Br_{0.5})_c$.

$Y^{m+}$ is preferably independently selected from $P^{5+}$, $As^{5+}$, $Ge^{4+}$, $Sb^{5+}$, $Sn^{4+}$, $B^{3+}$, $Si^{4+}$, $Al^{3+}$ and $Ga^{3+}$.

$Y'^{q+}$ is preferably independently selected from $Ge^{4+}$ and $Si^{4+}$.

$Y''^{r+}$ is preferably independently selected from $P^{5+}Al^{3+}$, $Sn^{4+}$, $Ga^{3+}$ and $Sb^{5+}$.

Preferred solid electrolytes which can be prepared by the precursors according to the present invention are selected from $Li_6PS_5X$, wherein X is independently selected from Cl, Br, I, $Li_3PS_4$, $Li_7P_3S_{11}$, $Li_{10}YP_2S_{12}$, wherein Y is independently selected from Si, Sn, and Ge, more preferably $Li_3PS_4$, $Li_7P_3S_{11}$, $Li_{10}YP_2S_{12}$, wherein Y is independently selected from Si, Sn, and Ge.

Product homogeneity and purity may be determined by conventional means known in the art such as X-ray powder diffraction (XRD). In particular, a typical XRD pattern of solid electrolytes according to the invention, e.g. recorded using $CuK_\alpha$ radiation, has dominating product reflections and, if at all, minor reflections deriving from impurities such as by-products and unreacted starting material.

In a preferred embodiment, the solid electrolyte is in the form of a pure phase. The presence of a pure phase can be detected by X-ray diffraction (XRD) as known by the skilled person and in the art.

Particularly, the solid electrolytes according to the invention are substantially free from reflections in a X-ray powder diffractogram using $CuK_\alpha$ radiation at a $2\theta$ angle [°]: 15.0, 18.9, 19.3, 24.9, 27.7, 27.9, 28.2, 29.2, 29.7, 30.0, 30.2, 31.0, 31.6, 31.7, 32.1, 32.3, 32.5, 34.9, 44.8, 46.7, 50.2, 52.1, 53.1, and/or 53.9 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 34.9 and/or 50.2 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 32.5 and/or 46.7 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 44.8 and/or 53.1 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 27.7, 30.0 and/or 31.6 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 27.9, 29.7 and/or 31.7 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 24.9, 29.2 and/or 32.3 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 18.9, 30.2 and/or 52.1 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 19.3, 31.0 and/or 53.9 corresponding to reflections of undesired impurities.

In a preferred embodiment, the solid electrolyte according to the invention is substantially free from reflections in a X-ray powder diffractogram using $CuK_\alpha$ radiation at a $2\theta$ angle [°]: 15.0, 28.2 and/or 32.1 corresponding to reflections of undesired impurities.

In a further aspect the present invention refers to a method for preparing a solid electrolyte comprising the steps of
  (a) providing a solid electrolyte precursor according to the invention in a reaction vessel,
  (b) contacting at least one X-containing and/or S-containing lithium salt and/or Y-containing sulfide with the solid electrolyte precursor of step (a) at elevated temperatures, and
  (c) optionally discharging the product obtained in step (b).

8

Preferably step a) is preceded by a method for producing a solid electrolyte precursor according to the invention, and particularly step a) is subsequent to step (iii).

Step a) may be carried out in dry air or in inert gas atmospheres, such as $N_2$, He or Ar atmosphere. Preferably, the inert gas or dry air is substantially free from water, i.e. having a relative humidity (RH) of less than 10 vol. %, preferably less than 5 vol. %, more preferably 0.01-2 vol. %. In a preferred embodiment the reaction vessel is sealed in step a) and/or step b).

In step b) the solid electrolyte precursor of step a) may be contacted with an X-containing lithium salt at elevated temperatures. The X-containing lithium salt is preferably used for preparing a solid electrolyte of formula (II). The X-containing lithium salt comprises a group 17 element such as fluoro, chloro, bromo and iodo, more preferably chloro, bromo and iodo, even more preferably chloro and bromo, even more preferably chloro. In a preferred embodiment, the X-containing lithium salt is a lithium chloride, lithium bromide, lithium iodide or a mixture thereof. Preferably, the X-containing lithium salt is substantially free from water, i.e. having RH of less than 10 wt. %, preferably less than 5 wt. %, more preferably 0.01-2 wt. %.

In step b) the solid electrolyte precursor of step a) may be contacted with an S-containing lithium salt at elevated temperatures. The S-containing lithium salt is preferably used for preparing a solid electrolyte of formula (II) if c<1. In a preferred embodiment, the S-containing lithium salt is a lithium sulfide. Preferably, the S-containing lithium salt is substantially free from water, i.e. having RH of less than 10 wt. %, preferably less than 5 wt. %, more preferably 0.01-2 wt. %.

In step b) the solid electrolyte precursor of step a) may be contacted with an Y-containing sulfide at elevated temperatures. The Y-containing sulfide is preferably used for preparing a solid electrolyte of formula (III). The Y-containing sulfide is preferably $P_2S_5$. Preferably, the Y-containing sulfide is substantially free from water, i.e. having RH of less than 10 wt. %, preferably less than 5 wt. %, more preferably 0.01-2 wt. %.

The at least one X-containing and/or S-containing lithium salt and/or the Y-containing sulfide may be contacted with the solid electrolyte precursor by conventional means, such as stirring, in a fluidized bed reactor or the like.

The temperature maintained in step b) is performed at temperatures above 80° C., preferably at 90-700° C.

The molar ratio of X in the X-containing lithium salt or of S in the S-containing lithium salt to the solid electrolyte precursor provided in step a) may be 0.01:1-3:1, preferably 0.1:1-2:1, more preferably 1:1.

The molar ratio of Y in the Y-containing sulfide to the solid electrolyte precursor provided in step a) may be 0.01:1-6:1, preferably 0.1:1-6:1, more preferably 1:1 or 4:1.

The duration of step b) may be up to 48 hours, such as 15 minutes to 30 hours, dependent on the individual reaction conditions.

In order to provide a proper reaction atmosphere such as an inert gas or dry air atmosphere during step (a) and/or step (b), the reaction vessel may be sealed, thus being isolated from the surrounding, while at least one gas inlet and at least one gas outlet allow for the controlled introduction and removal of gas such as dry air, inert gas into and from the vessel, respectively. The reaction vessel may be a fluidized bed reactor known in the art.

In one embodiment, the product obtained in step (b) is discharged from the reaction vessel.

Also encompassed by the present invention is a method for preparing a solid electrolyte as described above, further comprising a step of adding to the product obtained in step (b) at least one doping agent such as an anionic or cationic doping agent. Cationic doping agents may comprise Mn, Ge, Sn, V, Ni, Cr, Si, Al, As, O, Se, Te, Mg, Na, Ca, Sb, B, Ga in their respective oxidation states or a mixture thereof. Anionic doping agents may comprise $O^{2-}$, $Se^{2-}$ or $Te^{2-}$ The doping agent may be present in liquid, solid or gaseous form. Preferably, the doping agent is present in solid form such as in the form of a salt. Suitable cationic doping agents are e.g. hydroxide, carbonate or sulfide salts, such as $As_2S_5$, $Ni(OH)_2$ or $Mg(CO_3)$ or a mixture thereof. Suitable anionic doping agents are e.g. lithium salts, such as $Li_2O$, $Li_2Se$ or $Li_2Te$ or a mixture thereof.

The amount of doping agent added to the product obtained in step (b) is e.g. dependent on the type of doping agent and the amount of product obtained in step (b) and particularly results in an amount of dopant in the solid electrolyte being less than 10 wt. %, preferably 0.01-9.0 wt. %, more preferably 0.10-5.0 wt. %, with reference to the total weight of the solid electrolyte.

The step of adding at least one doping agent may additionally comprise mixing the product obtained in step (b) and the at least one doping agent by means of grinding, e.g. by a ball mill, or stirring known in the art. Preferably, the step of adding at least one doping agent is conducted if the solid electrolyte precursor provided in step (a) does not comprise a dopant.

In a further aspect, the present invention refers to a solid electrolyte obtainable by a method according to the invention. In contrast to solid electrolytes obtained by methods known in the art, such as a solid-based or solvent-based method, the solid electrolyte obtainable by a method according to the invention has an improved product homogeneity and purity, lacking unreacted starting material and intermediate phases. By this means, solid electrolytes having improved electric properties, such as improved ionic conductivity and electrochemical stability are obtained. Preferably the solid electrolyte obtainable by a method as described has an ionic conductivity of 0.01-500 mS/cm, preferably 1-100 mS/cm at 20° C.

In another aspect of the present invention refers to an electrochemical cell comprising the solid electrolyte as described above.

The present invention shall be further illustrated but not limited by the following example:

FIG. 1: XRD pattern of $Li_6PS_5Cl$ measured with CuKα radiation in a 2θ range of 5-90° and displayed as relative intensity $I_{rel}$. Peaks marked with # originate from the sample holder.

EXAMPLE 1

100.0 g of $LiOH \cdot H_2O$ having a total water content of 42 wt. % were heated at 150° C. for 1 h in a fluidized bed reactor. Subsequently, the pre-dried lithium salt was contacted with a reaction gas, comprising $P_2S_5$ and $H_2S$ in a molar ratio of 1:5, as well as nitrogen as a carrier gas in a content of 95 vol. % with respect to the total amount of gas, at a total gas flow of 18 m³/h for 1 h at 150° C., yielding the solid electrolyte precursor.

Then, the solid electrolyte precursor was contacted with solid lithium chloride salt at 400° C., wherein the molar ratio of LiCl to solid electrolyte precursor was 1:1.

The solid electrolyte obtained has a stoichiometric composition of Li:P:S:Cl of 6:1:5:1 and an ionic conductivity of 4.5 mS/cm at room temperature, measured under inert gas atmosphere with electrochemical impedance spectroscopy on an Metrohm Autolab in a frequency range from 1 MHz to 100 Hz. The sample pellet was prepared by grinding the solid electrolyte powder and filled into a pressurized sample cell with a diameter of 13 mm with stainless steel electrodes. The applied pressure during measurement was p=3t.

An X-ray powder diffraction analysis was conducted on a Bruker D2 phaser diffractometer with CuK$_\alpha$ radiation in a 2θ range of 5-90° with a step width of 0.020°.

The respective powder pattern is illustrated in FIG. 1 and showed characteristic reflections at a 2θ angle [°]: 25.53, 30.04, and 31.41, and no reflections at a 2θ angle [°]: 17.53, 18.05, 32.52, 34.88, 44.81, 46.66, 50.17, and 53.10.

The present invention comprises the following aspects:

1. A solid electrolyte precursor represented by the following formula (I):

$$Li_{(2a-n)}Y^{n+}S_a \qquad \text{(I)}$$

wherein Y is independently selected from P, As, Ge, Sn, B, Si, Al, Ga, and Sb, $3 \leq n \leq 5$, preferably $4 \leq n \leq 5$, and $3 \leq a \leq 6$, preferably $4 \leq a \leq 6$.

2. The precursor according to item 1, wherein $4.8 \leq a \leq 5.2$.

3. The precursor according to any of the preceding items, wherein $Y^{n+}$ is independently selected from $P^{5+}$, $As^{5+}$, $Ge^{4+}$, $Si^{4+}$, $B^{3+}$, $Sn^{4+}$, $Ga^{3+}$, $Al^{3+}$ and $Sb^{5+}$.

4. The precursor according to any of the preceding items, being selected from $Li_5PS_5$, $Li_5AsS_5$, $Li_4GeS_4$, $Li_4SiS_4$, $Li_3BS_3$, $Li_4SnS_4$, $Li_3GaS_3$, $Li_3AlS_3$, $Li_5SbS_5$ or mixtures thereof, such as physical mixtures, mixed crystals and/or solid solutions.

5. The precursor according to any of the preceding items, further comprising at least one dopant.

6. The precursor according to item 5, wherein the dopant is selected from Mn, Ge, Sn, V, Ni, Cr, Si, Al, As, O, Sb, B, Ga, Se, O, Te, Mg, Na, Ca or a mixture thereof in their respective oxidation state.

7. The precursor according to any of items 5-6, wherein the dopant is present in an amount of less than 10 wt. %, preferably 0.01-9.0 wt. %, more preferably 0.10-5.0 wt. %, with reference to the total weight of the precursor.

8. The precursor according to any of the preceding items, being in a crystalline or partially crystalline state, more preferably in the form of a pure phase.

9. A method for producing a solid electrolyte precursor according to any of items 1-8, comprising the steps of:

(i) providing a lithium salt in a reaction vessel, (ii) contacting a sulfur-containing reaction gas with the lithium salt of step (i) at elevated temperatures, (iii) contacting a Y-containing component with the product obtained in step (ii) at elevated temperatures, and (iv) optionally discharging the product obtained in step (iii), wherein the Y-containing component is at least partially present in a gaseous phase.

10. The method according to item 9, wherein the lithium salt has a water content of 0-50 wt. %, preferably 0-10 wt. %.

11. The method according to any of items 9-10, wherein step (i) is preceded by a step of pre-drying the lithium salt at an elevated temperature, such as at least 80° C., preferably 90-250° C., optionally at reduced pressure.

12. The method according to any of items 9-11, wherein the lithium salt in step (i) is LiOH, $Li_2CO_3$, $Li_2SO_4$, $Li_2O$, $Li_2O_2$ or a mixture thereof.

13. The method according to any of items 9-12, wherein step (i) and/or step (ii) and/or step (iii) is carried out in dry air or an inert gas atmosphere, such as $N_2$, He or Ar atmosphere.

14. The method according to item 13, wherein the inert gas or dry air is substantially free from water.

15. The method according to any of items 9-14, wherein step (ii) is performed at temperatures above 80° C., preferably at 90-250° C.

16. The method according to any of items 9-15, wherein the sulfur-containing reaction gas is selected from $H_2S$, $S_8$, $CS_2$, mercaptanes or a mixture thereof.

17. The method according to any of items 9-16, wherein step (iii) is performed at temperatures above 285° C., preferably at 288-1200° C.

18. The method according to any of items 9-17, wherein the Y-containing component is selected from $P_2S_5$, $As_2S_5$, $GeS_2$, $SiS_2$, $B_2S_3$, $SnS_2$, $Ga_2S_3$, $Al_2S_3$, $Sb_2S_5$ or a mixture thereof.

19. The method according to any of items 9-18, wherein the sulfur-containing reaction gas and the Y-containing component are substantially free from water.

20. The method according to any of items 9-19, wherein in step (ii) the molar ratio of S in sulfur-containing reaction gas, particularly $H_2S$, to Li in lithium salt provided in step (i) is 1:1-1:10, preferably 1:1-1:5, more preferably about 1:2.

21. The method according to any of items 9-20, wherein in step (iii) the molar ratio of Y in Y-containing component, particularly $P_2S_5$, to Li in lithium salt provided in step (i) is 1:1-1:10, preferably 1:3-1:6, more preferably about 1:5.

22. The method according to any of items 9-21, wherein the sulfur-containing reaction gas further comprises a carrier gas.

23. The method according to any of items 9-22, wherein the Y-containing component further comprises a carrier gas.

24. The method according to any of items 9-23, wherein step (ii) is performed at a total gas flow of 0.1-1000 $m^3/h$, preferably 5-500 $m^3/h$, more preferably 10-50 $m^3/h$.

25. The method according to any of items 9-24, wherein step (iii) is performed at a total gas flow of 0.1-1000 $m^3/h$, preferably 5-500 $m^3/h$, more preferably 10-50 $m^3/h$.

26. The method according to any of items 9-25, further comprising a step (ii.1), prior to step (iii), of adding to the product obtained in step (ii) at least one doping agent, e.g. an anionic or cationic doping agent.

27. The method according to any of items 9-26, further comprising a step (iii.1) of adding to the product obtained in step (iii) at least one doping agent, e.g. an anionic or cationic doping agent.

28. The method according to any of items 26-27, wherein the at least one doping agent is provided in the form of a salt.

29. Use of a solid electrolyte precursor according to any of items 1-8 for preparing a solid electrolyte, in particular a sulfidic solid electrolyte.

30. The use according to item 29, wherein the solid electrolyte is represented by the following formula (II):

$$Li_{(2b+c-m)}Y^{m+}S_bX_c \qquad \text{(II)}$$

wherein X is independently selected from group 17 elements, such as Cl, Br and I,
Y is independently selected from P, As, Ge, Sn, B, Si, Al, Ga, and Sb,
$3 \leq m \leq 5$, preferably $4 \leq m \leq 5$,
$3 \leq b \leq 6$, preferably $4 \leq b \leq 6$, and
$0 \leq c \leq 2$.

31. The use according to item 29, wherein the solid electrolyte is represented by the following formula (III):

$$Li_{(8-q*(1-t)-r*t)}Y'^{q+}_{1-t}Y''^{r+}_tS_4 \qquad \text{(III)}$$

wherein Y" is independently selected from Si, and Ge,
Y" is independently selected from P, Al, Sn, Ga, and Sb,
$3 \leq q \leq 5$
$2 \leq r \leq 6$
$0 \leq t < \leq 1$ 32. The use according to item 29, wherein the solid electrolyte is $Li_3PS_4$, $Li_7P_3S_{11}$, or $Li_{10}YP_2S_{12}$, wherein Y is independently selected from Si, Sn, and Ge.

33. A method for preparing a solid electrolyte, comprising the steps of:
(a) providing a solid electrolyte precursor according to any of items 1-8 in a reaction vessel,
(b) contacting at least one X-containing and/or S-containing lithium salt and/or Y-containing sulfide with the solid electrolyte precursor of step (a) at elevated temperatures, and
(c) optionally discharging the product obtained in step (b).

34. The method according to item 33, wherein step (a) and/or step (b) is carried out in dry air or an inert gas atmosphere, such as $N_2$, He or Ar atmosphere.

35. The method according to item 34, wherein the inert gas is substantially free from water.

36. The method according to any of items 33-35, wherein step (b) is performed at temperatures above 80° C., preferably at 90-700° C.

37. The method according to any of items 33-36, wherein the X-containing lithium salt is a halide, such as LiCl, LiBr, LiI or a mixture thereof, preferably LiCl or LiBr, and/or wherein the S-containing lithium salt is preferably $Li_2S$, and/or wherein the Y-containing sulfide is preferably $P_2S_5$.

38. The method according to any of items 33-37, wherein in step (b) the molar ratio of X in X-containing lithium salt or of S in the S-containing lithium salt to solid electrolyte precursor provided in step (a) is 0.01:1-3:1.

39. The method according to any of items 33-38, wherein the X-containing lithium salt is substantially free from water.

40. The method according to any of items 33-39, further comprising a step (b.1) of adding to the product obtained in step (b) at least one doping agent, e.g. an anionic or cationic doping agent.

41. The method according to item 40, wherein the at least one doping agent is provided in the form of a salt.

42. A solid electrolyte obtainable by a method according to any of items 33-41.

43. An electrochemical cell comprising the solid electrolyte according to item 42.

The invention claimed is:
1. A solid electrolyte precursor represented by the following formula (I):

$$Li_{(2a-n)}Y^{n+}S_a \qquad \text{(I)}$$

wherein Y is independently selected from P, As, B, Si, Al, Ga, and Sb, $4 \leq n \leq 5$, and $3.8 \leq a \leq 5.2$;

wherein the precursor comprises (a) no dopants, (b) one dopant selected from the group consisting of Mn, Ge, Sn, V, Ni, Cr, Si, Al, As, O, Sb, B, Ga, Se, Te, Mg, Na, and Ca in its oxidation state, or (c) a mixture of two or more dopants selected from the group consisting of Mn, Ge, Sn, V, Ni, Cr, Si, Al, As, O, Sb, B, Ga, Se, Te, Mg, Na, and Ca in their respective oxidation state.

2. A method for producing a solid electrolyte precursor according to claim 1, comprising the steps of:

(i) providing a lithium salt in a reaction vessel, (ii) contacting a sulfur-containing reaction gas with the lithium salt of step (i) at elevated temperatures, (iii) contacting a Y-containing component with the product obtained in step (ii) at elevated temperatures, and (iv) optionally discharging the product obtained in step (iii), wherein the Y-containing component is at least partially present in a gaseous phase.

3. The method according to claim 2, wherein in step (ii) the molar ratio of S in sulfur-containing reaction gas to Li in lithium salt provided in step (i) is 1:1-1:10.

4. The method according to claim 2, wherein in step (iii) the molar ratio of Y in Y-containing component to Li in lithium salt provided in step (i) is 1:1-1:10.

5. The method according to claim 2, wherein step (ii) and/or step (iii) is performed at a total gas flow of 0.1-1000 $m^3/h$.

6. A method for preparing a solid electrolyte using a solid electrolyte precursor according to claim 1, wherein the solid electrolyte is represented by the following formula (II):

$$Li_{(2b+c-m)}Y^{m+}{}_bS_bX_c \qquad (II)$$

wherein X is independently selected from group 17 elements,

Y is independently selected from P, As, B, Al, Ga, and Sb, $4 \leq m \leq 5$, $3.8 \leq b \leq 5.2$, and $0 \leq c \leq 2$.

7. A method for preparing a solid electrolyte, comprising the steps of:

(a) providing a solid electrolyte precursor according to claim 1, in a reaction vessel, (b) contacting at least one X-containing and/or S-containing lithium salt and/or Y-containing sulfide with the solid electrolyte precursor of step (a) at elevated temperatures, and (c) optionally discharging the product obtained in step (b).

8. The method according to claim 7, wherein the X-containing lithium salt is a halide.

9. The method according to claim 7, wherein in step (b) the molar ratio of X in X-containing lithium salt or of S in the S-containing lithium salt to solid electrolyte precursor provided in step (a) is 0.01:1-3:1.

10. The method according to claim 7, further comprising a step (b.1) of adding to the product obtained in step (b) at least one doping agent.

11. A solid electrolyte obtainable by a method according to claim 7.

12. An electrochemical cell comprising the solid electrolyte according to claim 11.

13. The precursor according to claim 1, wherein the precursor is selected from $Li_5PS_5$, $Li_5AsS_5$, $Li_5SbS_5$ or mixtures thereof.

14. The precursor according to claim 13, wherein the mixtures are physical mixtures, mixed crystals, and/or solid solutions.

15. The method of claim 2, wherein the lithium salt is LiOH, $Li_2CO_3$, $Li_2SO_4$, $Li_2O$, $Li_2O_2$ or a mixture thereof.

16. The method of claim 2, wherein the sulfur-containing reaction gas is $H_2S$, $S_8$, $CS_2$, mercaptanes or a mixture thereof.

17. The method according to claim 2, wherein the Y-containing component is $P_2S_5$, $As_2S_5$, $B_2S_3$, $Ga_2S_3$, $Al_2S_3$, $Sb_2S_5$ or a mixture thereof.

* * * * *